United States Patent Office 3,162,638
Patented Dec. 22, 1964

3,162,638
PROCESS FOR PREPARING DEHYDROISO-
CYCLOHEXIMIDES
Francis Johnson, Newton Lower Falls, and Arthur A. Carlson, Framingham, Mass., assignors to The Dow Chemical Company, Midland, Mich., a corporation of Delaware
No Drawing. Filed May 22, 1962, Ser. No. 196,617
14 Claims. (Cl. 260—281)

This invention is directed to a process for preparing dehydroisocycloheximide type compounds, and more particularly to a total synthesis for preparing these compounds in a stereospecific manner.

Dehydroisocycloheximides have been prepared by fermentation processes. A synthetic process for preparing this compound as well as related compounds would be very useful.

It is an object of this invention to provide a process for a totally synthetic route to dl-dehydroisocycloheximide and dehydroisocycloheximide type compounds. It is also an object of this invention to provide novel stereospecific glutarimide derivatives.

We discovered that benzyl β-keto-esters having at least one hydrogen atom in the alpha position can be reacted with 3-glutarimidyl acetyl chlorides in the presence of a Grignard type reagent, to yield, after reduction and decarboxylation, stereospecific dehydroisocycloheximide or related compounds. The synthesis of dl-dehydroisocycloheximide is illustrated in Equation I. The process in its broad aspects is illustrated in Equation II.

Equation I

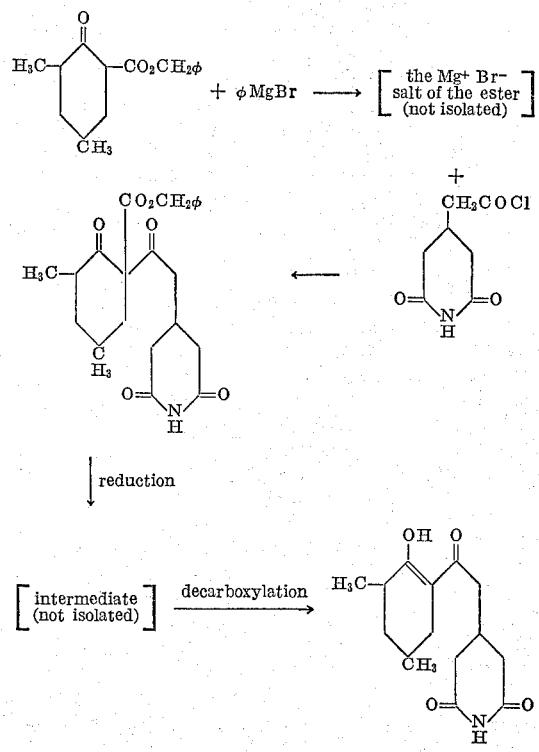

Equation II

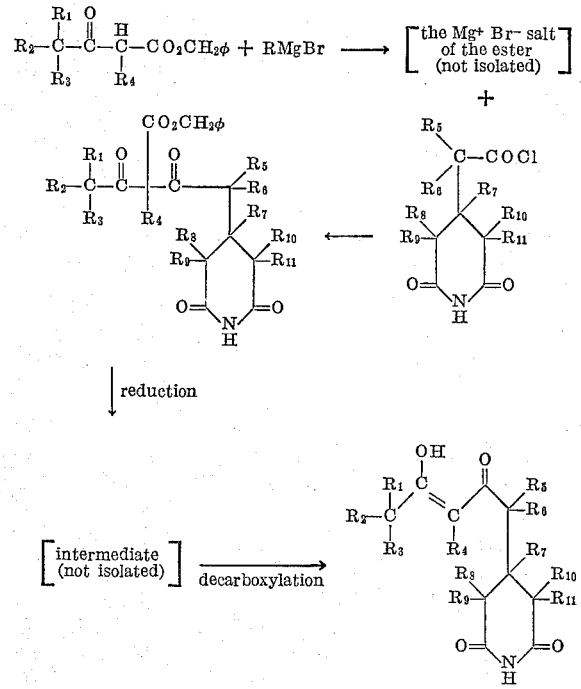

$\phi$ represents the phenyl radical. $R_1$–$R_{12}$ may be hydrogen or any substituting group or radical, such as lower alkyl, aryl, alkoxy, aryloxy, dialkylamino, halogen, etc. These are exemplified by methyl, butyl, benzyl, octyl, phenyl, diethylamine, phenoxyl, methoxyl, etc. $R_5$–$R_{11}$ are preferably hydrogen or lower alkyl. It is also preferred that not more than one hydrogen should be substituted for on any ring carbon. The $R_3$ and $R_4$ groups may be cyclized or fused to form cyclic moieties. These moieties may, and usually do, contain substituting groups on the ring carbons. The preferred $R_1$–$R_4$ containing moieties have the formula

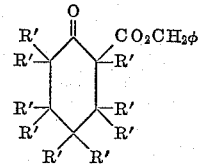

The preferred R′ groups are hydrogen, lower alkyl and halogen. It is also preferred that at least one R′ group on each ring carbon atom should be hydrogen. The useful substituting groups are those that do not react with components of the reaction mixture.

The benzyl β-keto-ester reactant is condensed with the 3-glutarimidyl acetyl chloride compound by first reacting the ester with a Grignard reagent to form the magnesium bromo salt of the benzyl β-keto-ester, and then adding the acetyl chloride. The formation of this salt is accomplished at temperatures of between −80° and 100° C., and preferably between 0 and 5° C. The addition of the Grignard, in an ether solution and preferably in tetrahydrofuran, is preferably made under an inert atmosphere, such as nitrogen. These conditions are conventional for the reactions of Grignard reagents.

The acylations with the 3-glutarimidyl acetyl chloride may be carried out over a wide temperature, i.e., −50° to 100° C. Room temperature and atmospheric pressure are preferred. Although the proportions of reactants may be varied, it is preferred to use stoichiometric proportions. Following acylation the reaction product is hydrogenated using a catalyst specific to the hydrogenolysis of a benzyloxy group, such as, palladium, platinum, rhodium, Raney nickel, etc. Standard reducing (hydrogenating) conditions, preferably at atmospheric pressure, are utilized, to cleave the benzyl ester. The reduced compound is then decarboxylated using conventional methods.

The Grignard reagents useful in the condensation reaction (designated RMgBr in Equations I and II) are phenyl magnesium bromides and such equivalent Grignards as methylmagnesium bromide, ethylmagnesium iodide, and lower alkylmagnesium halides, such as, p-tolylmagnesium iodide. Reagents which form equivalent salts of the benzyl ester, including such compounds as sodium hydride, lithium aryls, lithium hydride, lithium alkyls, zinc alkyls, sodamide, and sodium ethoxide, are equivalents of, and may be used in place of the Grignard reagent.

The benzyl β-keto-ester may be formed by conventional procedures, such as heating the corresponding ethyl ester with benzyl alcohol. Illustrative of the esters useful as reactants in this process are: benzyl cyclohexanone-2-carboxylate, benzyl acetoacetate, benzyl 2,4-dimethyl cyclohexanone-6-carboxylate. The benzyl ester is used because it permits easy removal of the ester group in the final stage of the process, i.e., the benzyl ester is cleaved by hydrogenation. Equivalent β-keto esters, such as the tert-butyl β-keto esters which are cleaved by heating with a trace of acid, may be used in place of the benzyl esters.

Substituted 3-glutarimidyl chlorides of the scope encompassed by the compounds in the formula set forth in Equation II herein-before are equivalents of 3-glutarimidyl acetyl chlorides and may be utilized in our process to prepare related compounds. The following are illustrative of these substituted 3-glutarimidyl acetyl chlorides:

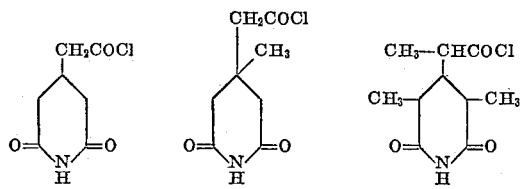

The products produced by the instant process have been designated dehydroisocycloheximide type compounds and represented by the formula

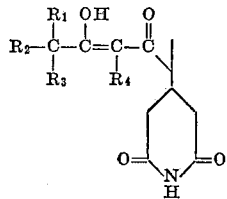

These compounds which are represented in the enolic form are usually in equilibrium with the diketone, as follows

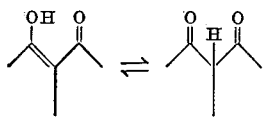

For simplicity, the use of the enolic representation herein, is meant to include the equilbrium diketone form as well.

Illustrative of the preparation of dl-dehydroisocylcoheximide and related stereospecific glutarimide derivatives are the following examples:

*Example 1*

To a solution of sodium metal (18.4 g.) in ethanol (300 ml.) under an atmosphere of nitrogen there was added a mixture of diethyl oxalate (116.8 g.) and 2,4-dimethylcyclohexanone (100.8 g.) over a period of one hour, the reaction flask being immersed in an ice-bath. After an additional one hour of stirring the ice-bath was removed and the reaction mixture allowed to stand at room temperature overnight. It was then reimmersed in the ice-bath, and sulphuric acid (22.4 ml.) in ice-water (175 ml.) added slowly with rapid stirring. Water (300 ml.) was then added to aid stirring. The organic layer was separated and the aqueous phase extracted with benzene. These extracts were combined with the previous organic phase and this was then washed with water, dried over anhydrous $Na_2SO_4$ and volatile organic material removed on the steam-bath under reduced pressure. The residual liquid was distilled and that portion (91 g.) boiling at 130–135°/10 mm. collected.

This material was distilled with powdered glass (0.6 g.) containing a trace of iron powder. The total distillate (77.6 g.) collected at 130–145°/17 mm. was fractionally distilled with care to yield ethyl 2,4-dimethyl-cyclohexanone-6-carboxylate (68.5 g.) $n_D^{25°}$ 1.4687.

Ethyl 2,4-dimethylcyclohexanone-6-carboxylate (68.5 g.) and benzyl alcohol (150 ml.) were placed in a flask and heated to boiling. This was maintained until no more ethanol distilled from the reaction mixture. The excess benzyl alcohol was then removed under reduced pressure and the residue distilled fractionally to give benzyl 2,4-dimethylcyclohexanone-6-carboxylate (61.6 g.) $n_D^{25°}$ 1.5244. *Analysis.*—Found: C, 74.0; H, 7.8. Req'd for $C_{16}H_{20}O_3$: C, 73.82; H, 7.74%.

In a dry, three-necked, flask equipped with nitrogen inlet, additional funnel, condenser and a magnetic stirrer, was placed benzyl 2,4-dimethylcyclohexanone-6-carboxylate (5.2 g.) in 40 ml. of dry tetrahydrofuran. With good stirring, and with the flask immersed in an ice-bath an ethereal solution of phenyl magnesium bromide (20 ml.; 0.02 mole) was added dropwise over 20 minutes. After this was complete a solution of 3-glutarimidyl-acetyl acid) in dry tetrahydrofuran (50 ml.) was added to the reaction mixture over a period of 30 minutes. Both additions were carried out under nitrogen and after completion of the second, the mixture was stirred for one hour and allowed to stand overnight at room temperature. The mixture was again immersed in an ice-bath and water (100 ml.) followed by 1 N sulfuric acid (20 ml.) added.

The organic layer was separated and the aqueous phase extracted with ethyl acetate. The organic solutions were combined and evaporated under reduced pressure. Ethyl acetate (100 ml.) was added and the solution dried over anhydrous magnesium sulfate. Removal of the organic solvents under reduced pressure led to a thick viscous pale brown oil (8.9 g.). This material was dissolved in pure ethyl acetate (100 ml.) and palladium-charcoal catalyst (2 g.; 10% Pd) added and the mixture reduced at atmospheric pressure under hydrogen. After hydrogen absorption ceased (87% of theory), the catalyst was removed by filtration and the ethyl acetate solution refluxed one hour to effect decarboxylation. Removal of the solvent led to a viscous yellow glass which when triturated ether-petrol ether afforded a white solid (3 g.), M.P. 125–30°. This solid was chromatographed over silica gel. Elution of the column with methylene chloride containing 5–20% of ethyl acetate led to a highly crystalline solid (2 g.) which when recrystallized from alcohol gave pure dl-dehydroisocyclohexamide (1.3 g.), M.P. 151–152°. *Analysis.*—Found: C, 64.6; H, 7.6; N, 5.0. Req'd for $C_{15}H_{24}NO_4$: C, 64.5; H, 7.6; N, 5.0%. The infrared of this material was identical with that of an optically active specimen prepared from naturally occurring isocyclohexamide. dl - Dehydroisocycloheximide is 1-oxo-1[(2-hydroxy - 3,5 - dimethyl-1-cyclohexenyl)-2(3-glutarimidyl)]ethane.

Example 2

Following the procedure of Example 1, benzyl 2-methylcyclohexanone-6-carboxylate is used in place of benzyl 2,4-dimethylcyclohexanone-6-carboxylate to yield 1-oxo-1[(2 - hydroxy - 3 - methyl - 1 - cyclohexenyl) - 2(3 - glutarimidyl)]ethane.

Example 3

Following the procedure of Example 1, benzyl 4-methylcylohexanone-6-carboxylate is used in place of benzyl 2,4-dimethylcyclohexanone-6-carboxylate to yield 1-oxo-1[(2 - hydroxy - 5 - methyl - 1 - cyclohexenyl) - 2(3 - glutarimidyl)]ethane.

Example 4

Following the procedure of Example 1, benzylcyclohexanone-1-carboxylate is used in place of benzyl 2,4-dimethylcyclohexanone-6-carboxylate to yield 1-oxo-1[(2-hydroxy-1-cyclohexenyl)-2(3-glutarimidyl)]ethane.

Example 5

Following the procedure of Example 1, benzyl 2-isohexanone-1-carboxylate is used in place of benzyl 2,4-dimethylcyclohexanone-6-carboxylate to yield 1-oxo-1[(2-hydroxy-1-isohexenyl)-2(3-glutarimidyl)]ethane.

Example 6

Following the procedure of Example 1, benzyl 2-propanone-1-carboxylate is used in place of benzyl 2,4-dimethylcyclohexanone-6-carboxylate to yield 1-oxo-1[(2-hydroxy-1-propenyl)-2(glutarimidyl)]ethane.

Example 7

Following the procedure of Example 1, benzyl 2,4-diethylcyclohexanone-6-carboxylate is used in place of benzyl 2,4-dimethylcyclohexanone - 6 - carboxylate to yield 1-oxo-1[(2 - hydroxy - 3,5 - diethyl-1-cyclohexenyl)-2(3-glutarimidyl)]ethane.

Example 8

Following the procedure of Example 1, benzyl 4-butoxycyclohexanone-6-carboxylate is used in place of benzyl 2,4 - dimethylcyclohexanone - 6 - carboxylate to yield 1-oxo-1[(2-hydroxy - 5 - butoxy-1-cyclohexenyl)-2(3-glutarimidyl)]ethane.

Example 9

Following the procedure of Example 1, benzyl 4-phenoxycyclohexanone-6-carboxylate is used in place of benzyl 2,4 - dimethylcyclohexanone - 6 - carboxylate to yield 1-oxo-1[(2-hydroxy - 5 - phenoxy - 1 - cyclohexenyl)-2(3-glutarimidyl)]ethane.

Example 10

Following the procedure of Example 1, benzyl 3-oxo-4,6-dimethylocta-5,7-dienoate is used in place of benzyl 2,4-dimethylcyclohexanone-6-carboxylate to yield 1-oxo-1[(2-hydroxy-3,5-dimethyl-hepta - 1,4,6 - triene)-2(3-glutarimidyl)]ethane, more commonly designated dehydrostreptimidone.

Similarly, other related stereospecific glutarimide derivatives are prepared from starting materials corresponding to the general definitions of the compounds in Equation II, wherein substituent R groups are varied. Equivalent salt forming compounds, such as sodiumamide, phenyllithium, sodium hydride, and phenylmagnesium chloride are used in place of phenylmagnesium bromide to obtained the same final reaction product.

The 3-glutarimide derivatives prepared by our process have biological activity. They are active as rodent repellents and fungicidal agents.

Although our process has been described in connection with a limited number of examples, it is to be understood that our invention includes all modifications and variations that come within the scope of the appended claims.

We claim:

1. The process for preparing 3-glutarimidyl derivatives comprising reacting a benzyl β-keto-ester having the formula:

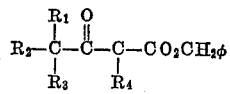

with a Grignard reagent to form a salt of said benzyl ester, acylating said salt with a 3-glutarimidyl acetyl chloride having the formula:

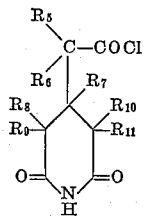

and then reducing and decarboxylating the product of the acylation to obtain a compound having the formula

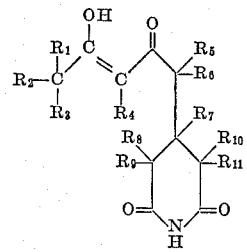

wherein $R_1$ to $R_{12}$ are selected from the class consisting of hydrogen, lower alkyl, monocyclicaryl, loweralkoxy, monocyclicaryloxy, diloweralkylamino, and halogen.

2. The process of claim 1 wherein the Grignard reagent is phenylmagnesium bromide.

3. The process for preparing 3-glutarimidyl derivatives comprising reacting a cyclic benzyl β-keto-ester having the formula

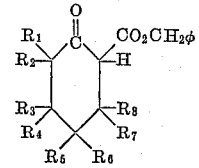

with a compound selected from the group consisting of lower alkylmagnesium halides, monocyclic arylmagnesium halides, lithium lower alkyls, lithium monocyclic aryls, zinc lower alkyls, sodium hydride, lithium hydride, sodamide and sodium ethoxide, to form a salt of said benzyl ester, acylating said salt with a 3-glutarimidyl chloride having the formula

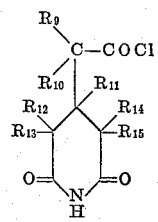

and then reducing and decarboxylating the product of the acylation to obtain a compound having the formula

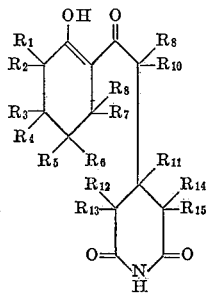

wherein $R_1$ to $R_{15}$ are selected from the class consisting of hydrogen, lower monocyclicaryl, loweralkoxy, monocyclicaryloxy, diloweralkylamino, and halogen.

4. The process of claim 3 wherein the salt forming reagent is a bromo Grignard reagent.

5. The process of claim 4 wherein the Grignard is phenylmagnesium bromide and wherein the acylation product is treated with a palladium catalyst at atmospheric pressure under hydrogen to reduce said product.

6. The process of claim 5 wherein the benzyl β-keto-ester is benzyl 2,4-dimethylcyclohexanone-6-carboxylate.

7. The process of claim 5 wherein the benzyl β-keto-ester is benzyl 2-methylcyclohexanone-6-carboxylate.

8. The process of claim 5 wherein the benzyl β-keto-ester is benzyl 4-methylcyclohexanone-6-carboxylate.

9. The process of claim 5 wherein the benzyl β-keto-ester is benzyl cyclohexanone-6-carboxylate.

10. The process of claim 5 wherein the benzyl β-keto-ester is benzyl 3-oxo-4, 6-dimethylocta-5,7-dienoate.

11. Process for preparing dl-dehydroisocycloheximide comprising reacting benzyl 2,4-dimethylcyclohexanone-6-carboxylate with phenylmagnesium bromide in an ether solution, under nitrogen, adding 3-glutarimidyl acetyl chloride to form the glutarimide derivative, separating the organic phase, reducing the glutarimidyl derivative, and then decarboxylating, to obtain dl-dehydroisocycloheximide.

12. The process of claim 11 wherein the benzyl 2,4-diethylcyclohexanone-6-carboxylate was prepared by reacting diethyl oxalate with 2,4-dimethylcyclohexanone to form ethyl 2,4-dimethylcyclohexanone-6-carboxylate and then refluxing with benzyl alcohol.

13. The process of claim 11 wherein the phenylmagnesium bromide was in solution of tetrahydrofuran.

14. The process of claim 5 wherein the reduction is carried out in ethyl acetate, followed by removal of the catalyst, and then refluxing to effect decarboxylation.

References Cited in the file of this patent

Brewster: Organic Chemistry, 2d ed., p. 203 (1953).
Suzuki: Chem. Pharm. Bull. Japan, vol. 8, No. 8, pp. 706–712 (1960).
Suzuki: J. Pharm. Soc. Japan, vol. 80, No. 9, pp. 1217–1221, p. 1219 relied on (1960).